(12) United States Patent
Lee et al.

(10) Patent No.: US 7,926,289 B2
(45) Date of Patent: Apr. 19, 2011

(54) DUAL INTERSTAGE COOLED ENGINE

(75) Inventors: Ching-Pang Lee, Cincinnati, OH (US);
Thomas Ory Moniz, Loveland, OH (US); Robert Joseph Orlando, West Chester, OH (US)

(73) Assignee: General Electric Company, Schenectady, NY (US)

( * ) Notice: Subject to any disclaimer, the term of this patent is extended or adjusted under 35 U.S.C. 154(b) by 1286 days.

(21) Appl. No.: 11/595,670

(22) Filed: Nov. 10, 2006

(65) Prior Publication Data

US 2008/0112795 A1 May 15, 2008

(51) Int. Cl.
*F02C 6/08* (2006.01)
(52) U.S. Cl. ............ 60/782; 60/785; 60/795; 60/806; 415/145; 415/199.5; 416/96 R; 416/97 R
(58) Field of Classification Search ............ 60/782, 60/785, 795, 806; 415/145, 199.5; 416/97 R, 416/96 R
See application file for complete search history.

(56) References Cited

U.S. PATENT DOCUMENTS

| | | | |
|---|---|---|---|
| 3,034,298 A | 5/1962 | White | |
| 4,080,785 A | 3/1978 | Koff et al. | |
| 4,741,153 A | 5/1988 | Hallinger et al. | |
| 4,852,355 A | 8/1989 | Kenworthy et al. | |
| 5,134,844 A | 8/1992 | Lee et al. | |
| 5,135,354 A | 8/1992 | Novotny | |
| 5,142,859 A | 9/1992 | Glezer et al. | |
| 5,174,105 A | 12/1992 | Hines | |
| 5,232,339 A | 8/1993 | Plemmons et al. | |
| 5,288,210 A | 2/1994 | Albrecht et al. | |
| 5,317,877 A | 6/1994 | Stuart | |
| 5,472,313 A | 12/1995 | Quinones et al. | |
| 5,498,126 A | 3/1996 | Pighetti | |
| 5,555,721 A | 9/1996 | Bourneuf et al. | |
| 5,611,197 A | 3/1997 | Bunker | |
| 5,996,331 A | 12/1999 | Palmer | |
| 6,050,079 A | 4/2000 | Durgin et al. | |
| 6,092,991 A | 7/2000 | Tomita et al. | |
| 6,183,193 B1 | 2/2001 | Glasspoole et al. | |
| 6,220,814 B1 | 4/2001 | Brushwood et al. | |
| 6,331,097 B1 | 12/2001 | Jendrix | |
| 6,487,863 B1 | 12/2002 | Chen et al. | |

(Continued)

FOREIGN PATENT DOCUMENTS

DE 2065334 A1 4/1973

(Continued)

OTHER PUBLICATIONS

U.S. Appl. No. 11/595,606, filed Nov. 10, 2006, by Ching-Pang Lee et al.

(Continued)

*Primary Examiner* — Michael Cuff
*Assistant Examiner* — Craig Kim
(74) *Attorney, Agent, or Firm* — William S. Andes; Francis L. Conte

(57) ABSTRACT

A gas turbine engine includes a compressor, combustor, and high pressure turbine operatively joined together. A first interstage bleed circuit is joined in flow communication between a first preultimate stage of the compressor and hollow blades in the turbine to provide thereto pressurized primary air. A second interstage bleed circuit is joined in flow communication between a second preultimate stage of the compressor and the turbine blades to provide thereto pressurized secondary air at a lower pressure than the primary air.

25 Claims, 4 Drawing Sheets

U.S. PATENT DOCUMENTS

| | | |
|---|---|---|
| 6,923,247 B1 | 8/2005 | Ferber et al. |
| 6,960,060 B2 * | 11/2005 | Lee ............................ 415/115 |
| 6,981,841 B2 | 1/2006 | Krammer et al. |
| 2004/0179936 A1 | 9/2004 | Fitzgerald et al. |
| 2005/0111964 A1 * | 5/2005 | Krammer et al. ............ 415/115 |

FOREIGN PATENT DOCUMENTS

| | | |
|---|---|---|
| EP | 0584958 A1 | 3/1994 |
| EP | 0543627 A1 | 5/1996 |
| EP | 0768448 A1 | 4/1997 |
| EP | 1262634 A2 | 12/2002 |
| EP | 1306521 A1 | 5/2003 |
| EP | 1503061 A1 | 2/2005 |
| EP | 1505254 A2 | 2/2005 |
| EP | 1528238 A1 | 5/2005 |
| EP | 1621734 A1 | 2/2006 |
| EP | 1643081 A2 | 4/2006 |
| GB | 2081392 A | 2/1982 |
| GB | 2420155 A | 5/2006 |

OTHER PUBLICATIONS

U.S. Appl. No. 11/595,669, filed Nov. 10, 2006, by Ching-Pang Lee et al.

U.S. Appl. No. 11/595,668, filed Nov. 10, 2006, by Ching-Pang Lee et al.

General Electric Company, "CF6-80C2 Engine Airflow FADEC Control," Engine in public use and on sale in US more than one year before Sep. 1, 2006, single page.

General Electric Company, "CFM56-5C2-CDP Air for Turbine Cooling," Engine in public use and on sale in US more than one year before Sep. 1, 2006, two pages.

* cited by examiner

DUAL INTERSTAGE COOLED ENGINE

BACKGROUND OF THE INVENTION

The present invention relates generally to gas turbine engines, and, more specifically, to turbine cooling therein.

In a gas turbine engine, air is pressurized in a compressor and mixed with fuel in a combustor for generating hot combustion gases. Energy is extracted from the combustion gases in turbine stages which power the compressor through one drive shaft, and produce additional work for powering an upstream fan in a turbofan aircraft engine application, or driving an external drive shaft for marine and industrial (M&I) applications.

The basic core engine typically includes a multistage axial compressor having rows of compressor blades and corresponding guide vanes which pressurize ambient air in stages and correspondingly increase the temperature thereof. The air discharged from the aft end of the compressor has the highest pressure, commonly referred to as compressor discharge pressure (CDP), and a correspondingly high temperature.

In an exemplary configuration, the compressor may have seven stages for increasing air pressure many times atmospheric pressure along with many hundreds of degrees of temperature increase due to the compression cycle. A fewer or greater number of compression stages may be used as desired for the specific design of the gas turbine engine and its intended use.

A majority of the CDP air discharged from the compressor is mixed with fuel in the combustor for generating hot combustion gases. These combustion gases then undergo an expansion cycle in the several turbine stages for extracting energy therefrom which correspondingly reduces the pressure of the combustion gases and the temperature thereof. A high pressure turbine (HPT) immediately follows the combustor and is used to power the compressor blades in the core engine.

A low pressure turbine (LPT) follows the HPT and drives the second shaft for powering the upstream fan in the turbofan engine application, or driving an external drive shaft for M&I applications.

The overall efficiency of the gas turbine engine is dependent on the efficiency of air compression, efficiency of combustion, and efficiency of combustion gas expansion in the turbine stages.

Since turbine components are directly exposed to hot combustion gases during operation, they require suitable cooling thereof to ensure long useful life. For example, some of the compressor discharge air is diverted from the combustion process for cooling liners of the combustor itself, as well as cooling various components of the HPT.

Each turbine stage typically includes an upstream turbine nozzle or stator having a row of nozzle vanes which direct the combustion gases downstream through a corresponding row of turbine rotor blades. The blades are typically mounted to the perimeter of a supporting rotor disk in corresponding dovetail slots formed therein.

The turbine blades and vanes are typically hollow airfoils with corresponding internal cooling channels therein which receive compressor discharge air for cooling thereof during operation. The hollow blades and vanes typically include various rows of film cooling and other discharge holes through the pressure and suction sidewalls thereof for discharging the spent internal cooling air in corresponding external films for further protecting the airfoils.

Furthermore, the turbine rotor disk which supports the first stage turbine blades is a relatively large component with a rim in which the blades are mounted, a narrow web extending radially inwardly therefrom which terminates in a wider hub having a central bore. The rotor disk is subject to both considerable centrifugal loads and heating during operation and must also be designed for long life.

In contrast, the LPT requires less cooling than the HPT in view of the reduction in combustion gas temperature and pressure during the expansion cycle. The cooling requirements are therefore reduced, and typically interstage bleed air may be used for cooling various components therein.

The main turbine flowpath is designed to confine the combustion gases as they flow through the engine and decrease in temperature and pressure from the combustor. The various cooling circuits for the turbine components are independent from the main flowpath and must be provided with cooling air at sufficient pressure to prevent ingestion of the hot combustion gases therein during operation.

For example, suitable rotary seals are provided between the stationary turbine nozzles and the rotating turbine blades to prevent ingestion or back flow of the hot combustion gases into the cooling circuits. Since the airfoils of the nozzle vanes and turbine blades typically include rows of cooling air outlet holes, the cooling air must have sufficient pressure greater than that of the external combustion gases to provide a suitable backflow margin to prevent ingestion of the hot combustion gases into the turbine airfoils themselves.

Accordingly, the components of the HPT are typically cooled using the full-pressure CDP air, whereas LPT components may be cooled using lower pressure, interstage bleed air.

In this way, the use of compressor air for cooling turbine components may be matched to the different cooling requirements of the HPT and the LPT for reducing the use thereof and therefore increasing engine efficiency.

However, increasing engine efficiency is a continuing and paramount design objective in modern gas turbine engines, and it is therefore desired to further increase engine efficiency by reducing pressurized air extracted from the compressor.

BRIEF DESCRIPTION OF THE INVENTION

A gas turbine engine includes a compressor, combustor, and high pressure turbine operatively joined together. A first interstage bleed circuit is joined in flow communication between a first preultimate stage of the compressor and hollow blades in the turbine to provide thereto pressurized primary air. A second interstage bleed circuit is joined in flow communication between a second preultimate stage of the compressor and the turbine blades to provide thereto pressurized secondary air at a lower pressure than the primary air.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
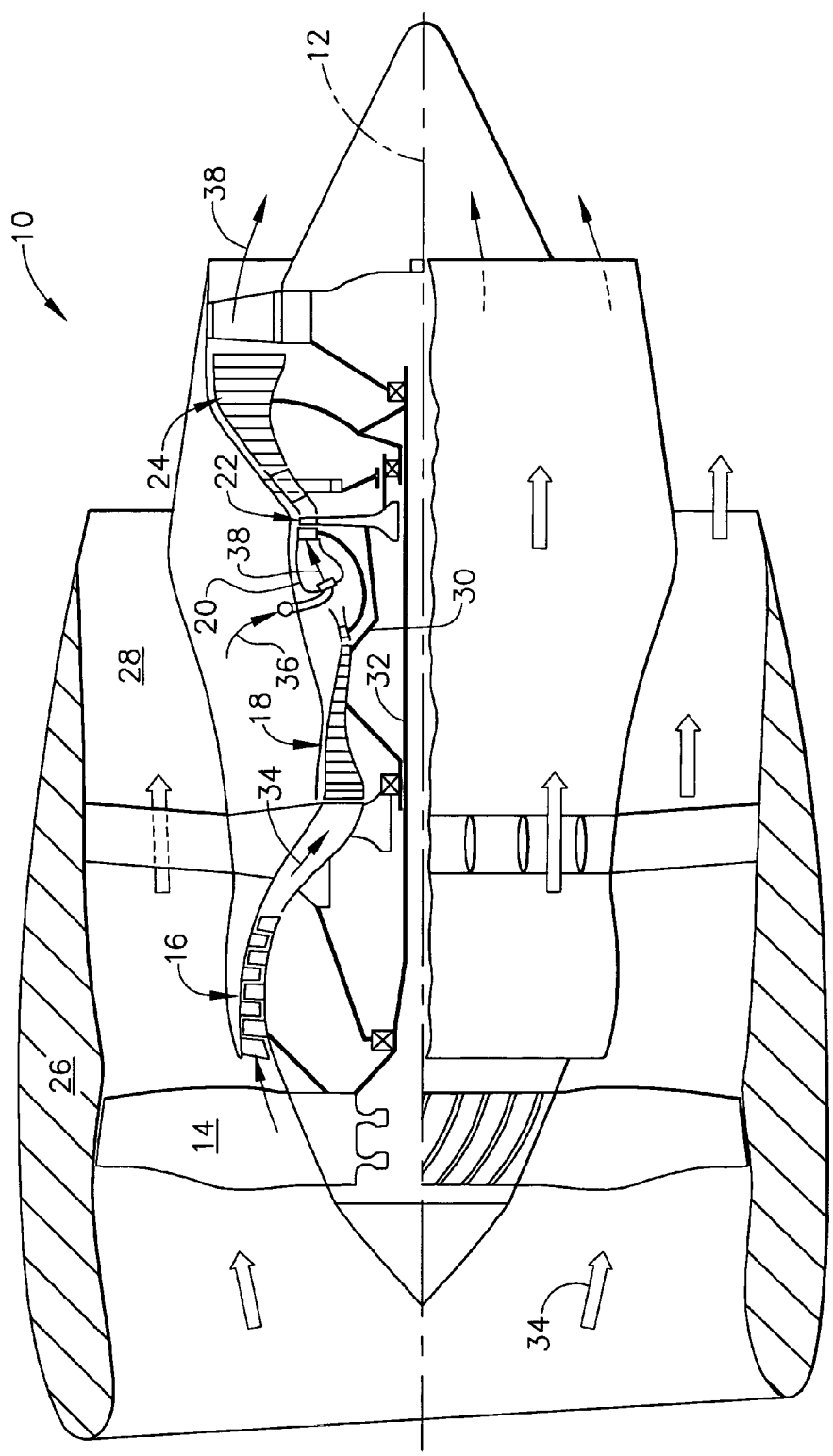
FIG. 1 is a partly sectional, axial schematic view of a turbofan gas turbine engine.

Illustrated schematically in FIG. 1 is an exemplary turbofan aircraft gas turbine engine 10. The engine is axisymmetrical about a longitudinal or axial centerline axis 12 and is suitably mounted to the wing or a fuselage of an aircraft (not shown) for powering an aircraft in flight in an exemplary application.

The engine includes in serial flow communication a fan 14, a low pressure or booster compressor 16, a high pressure (HP) compressor 18, an annular combustor 20, a high pressure turbine (HPT) 22, and a low pressure turbine (LPT) 24.

An annular nacelle 26 surrounds the fan 14 and defines an annular bypass duct 28 extending aft around the booster compressor 16. A first drive shaft 30 joins the HPT 22 to the HP compressor 18, and a second drive shaft 32 joins the LPT 24 to the fan 14 and booster compressor 16. The two drive shafts are suitably mounted in bearings in corresponding frames within the engine in a conventional configuration of the various engine components described above.

During operation, ambient air 34 enters the inlet of the engine and is pressurized in part by the fan 14 and discharged through the bypass duct 28 for providing a majority of propulsion thrust. Some of the air 34 passing the fan enters the booster compressor 16 and undergoes a further compression cycle in the multiple axial stages thereof, with additional compression also being provided in the HP compressor 18 in the multiple axial stages thereof.

The pressurized air 34 is discharged from the compressor and suitably mixed with fuel 36 in the combustor 20 for generating hot combustion gases 38. Energy is extracted from the combustion gases 38 in the HPT 22 to drive the first shaft 30 and power the HP compressor 18. Additional energy is extracted from the combustion gases in the LPT 24 to drive the second shaft 32 and power the fan 14 and booster compressor 16.

The engine as described above is conventional in configuration and operation and includes multiple compression stages and multiple turbine stages. For example, the booster compressor 16 may have four axial stages including four rows of compressor blades alternating axially with four rows of inlet guide vanes.

Figure 2:
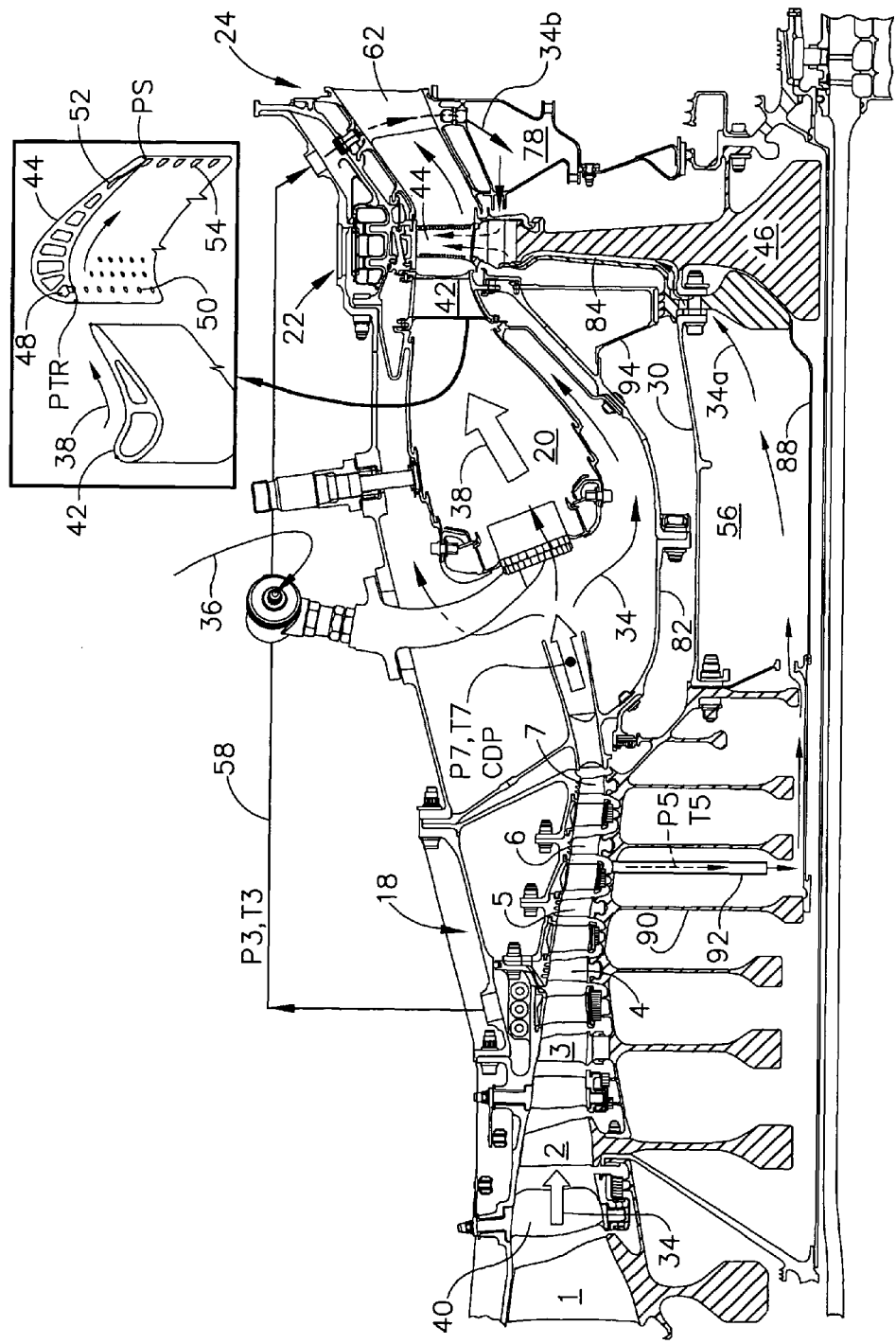
FIG. 2 is an enlarged, axial sectional view through a portion of the core engine illustrated in FIG. 1.

The high pressure compressor 18 may include seven axial stages for example, having seven rows of compressor blades 1-7 as shown in detail in FIG. 2 alternating axially with corresponding rows of inlet guide vanes 40, and discharging the CDP air through a conventional diffuser.

The HPT 22 is preferably a single stage turbine followed in turn by an exemplary five stage LPT 24.

FIG. 2 illustrates in more detail the basic core engine including the high pressure compressor 18, annular combustor 20, and HPT 22 disposed in serial flow communication.

The HPT 22 illustrated in FIG. 2 includes a first stage or HP turbine nozzle having a row of stator vanes 42 suitably mounted in outer and inner bands. Following the vanes is a single row of HP turbine blades 44 removably mounted to the perimeter or rim of a first stage or HP rotor disk 46. The disk 46 is fixedly joined to the first drive shaft 30 which in turn is fixedly joined to the rotor disks supporting the compressor blades 1-7 of the high pressure compressor 18.

The configuration and operation of the HP compressor 18 and the HPT 22 are conventional for pressurizing the air 34 and expanding the subsequent combustion gases 38 for extracting energy therefrom. In particular, the pressure and temperature of the air 34 increase axially in turn as the air flows downstream through the seven stages of compressor blades 1-7. The seventh row of compressor blades 7 defines the last stage of the compressor in this exemplary configuration and discharges the pressurized air at a maximum pressure P7 and a correspondingly high temperature T7 associated with the compressor discharge pressure (CDP) air.

The CDP air is mixed with the fuel in the combustor to generate the hot combustion gases 38 which are discharged from the outlet of the combustor between the first stage turbine nozzle vanes 42. These vanes are disposed axially between the combustor and the first stage turbine blades 44 and are conventionally configured for dropping or reducing the pressure in the combustion gases along the airfoil chord and across the leading and trailing edges of the vanes.

Each nozzle vane 42 has the typical generally concave pressure side and generally convex opposite suction side extending axially in chord between the upstream leading edge and the downstream trailing edge. The contour of the nozzle vanes 42 may be suitably selected to effect a substantial pressure drop as the combustion gases flow downstream between the inlet and outlet ends of the turbine nozzle. Gases flowing through a turbine nozzle are accelerated and turned which causes a small drop in total pressure and a large drop in static pressure.

Correspondingly, the first stage turbine blades 44 also illustrated in FIG. 2 have the generally concave pressure side and generally convex opposite suction side extending axially between the leading and trailing edges thereof. The profile of the turbine blades 44 is also conventionally selected for additionally dropping or reducing pressure of the combustion gases 38 along the airfoil chord and across the leading and trailing edges thereof. Work or energy is extracted from the gases flowing between turbine rotor blades which causes a large drop in both total pressure and static pressure.

Figure 3:
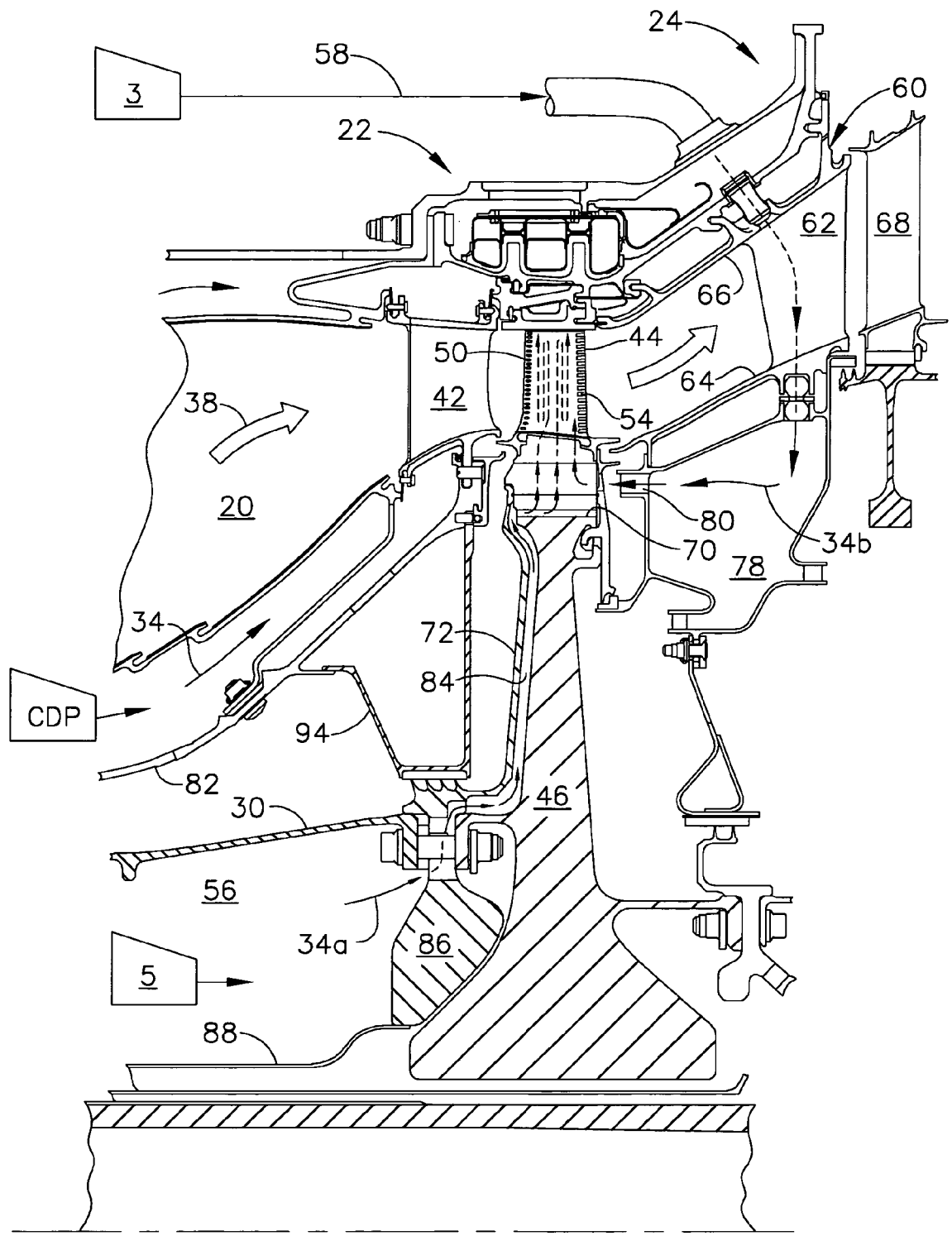
FIG. 3 is an enlarged, axial sectional view of the high pressure turbine illustrated in FIG. 2.
Figure 4:
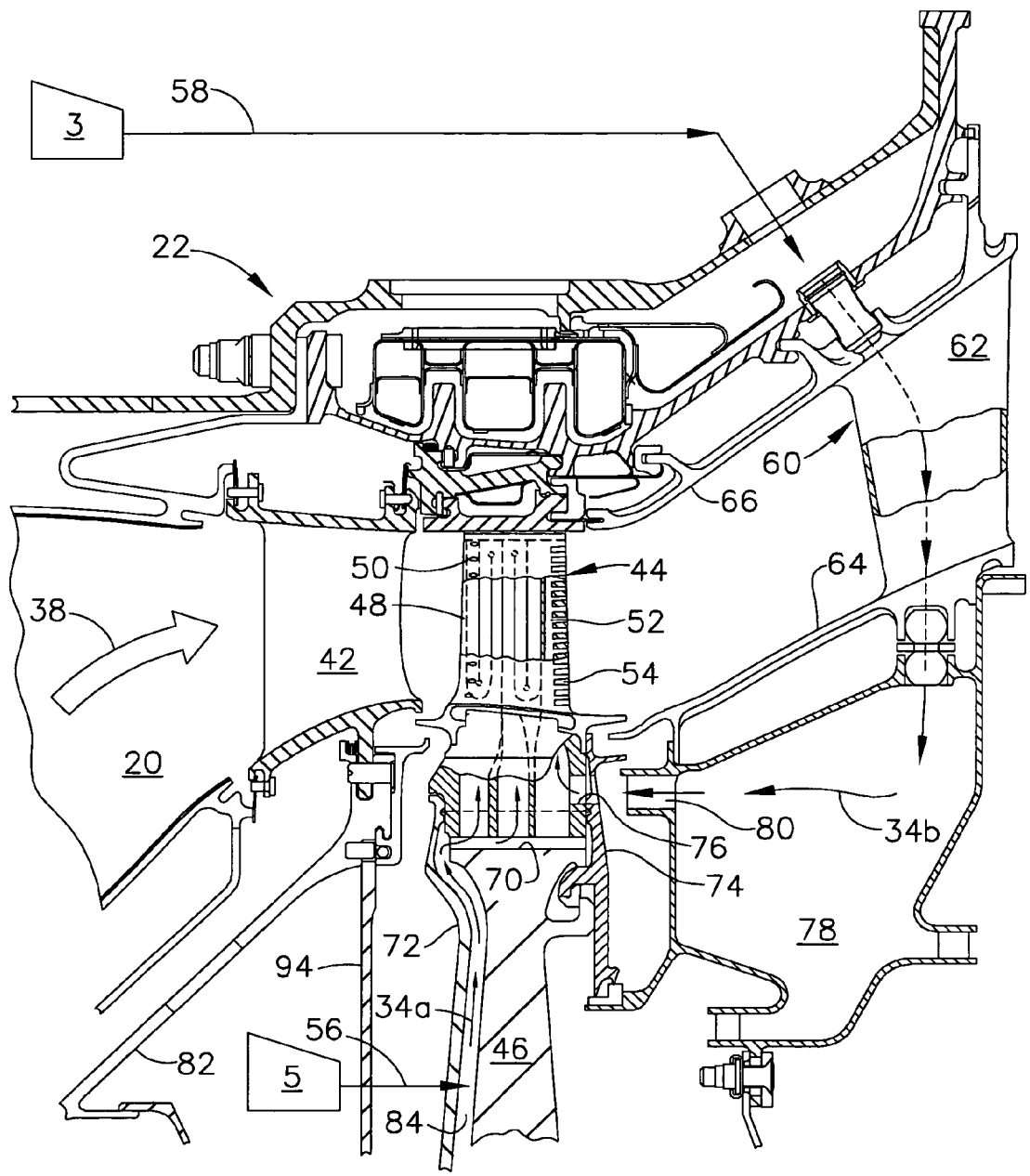
FIG. 4 is a further enlarged, axial sectional view of the high pressure turbine shown in FIG. 3.

FIGS. 3 and 4 illustrate the HPT 22 in more detail, including the turbine blades 44 which require suitable cooling from the hot combustion gases 38 during operation. The blades 44 are typically hollow for providing internal cooling thereof in a conventional manner, except as modified hereinbelow.

The blades may have any suitable internal cooling configuration, and FIG. 4 illustrates an exemplary three-pass forward serpentine cooling channel 48 having an inlet at the base of the axial-entry dovetail thereof, and terminating in an impingement channel which spans the length of the airfoil directly behind the leading edge. The forward channel 48 feeds one or more rows of film cooling holes 50 which cover the airfoil leading edge and provide additional film cooling thereof as the spent cooling air is discharged from these holes in typical fashion.

The exemplary turbine blade illustrated in FIG. 4 also includes an aft cooling channel 52 which spans the length of the airfoil immediately forward of the thin trailing edge to feed a row of trailing edge cooling holes 54 that discharge spent air along the aft end of the pressure side. The aft cooling channel 52 has a suitable inlet in the aft end of the shank above the dovetail as further described hereinbelow.

In the exemplary configuration illustrated in FIG. 4, the blade 44 also includes a three-pass serpentine middle channel, with a corresponding inlet also in the base of the dovetail.

In this way, pressurized air is bled from the compressor and channeled through several internal cooling circuits of the blade 44 for providing internal cooling thereof in any conventional manner, with the spent air then being discharged through the various rows of outlet holes found in the pressure and suction sides of the airfoil from the leading edge to the trailing edge.

Whereas the compression stages increase pressure and temperature of the air as energy is added, the turbine stages decrease pressure and temperature of the combustion gases for extracting energy therefrom.

Since the use of a single stage HPT 22 illustrated in FIG. 2 permits a substantial pressure drop to occur in the combustion gases first across the nozzle vanes 42 and then across the turbine blades 44, an improved cooling system for the HPT 22 may be used for further increasing efficiency of the engine.

More specifically, FIG. 2 initially illustrates a first interstage bleed circuit 56 suitably joined in flow communication between a first preultimate stage of the HP compressor 18 and the forward cooling channels 48 of the HP blades 44 to provide thereto pressurized primary air 34a bled from the compressor at a corresponding first pressure and temperature.

A preultimate compressor stage is any suitable stage before the last stage of the compressor, which last stage discharges the CDP air 34 to the combustor. As indicated above, the HP compressor 18 has seven exemplary stages, with the seventh stage being the last stage, and a suitable first preultimate stage being the fifth stage which includes the fifth stage blades 5.

The primary air 34a may be bled from the fifth stage in any conventional manner, typically at the following guide vanes, at a corresponding fifth-stage pressure P5 and fifth-stage temperature T5 which are substantially less than the pressure P7 and the temperature T7 of the compressor discharge air.

Correspondingly, a second interstage bleed circuit 58 is joined in flow communication between a different, second preultimate stage of the compressor 18 and the aft cooling channels 52 of the same HP blades 44 to provide dual interstage cooling thereof for enhanced performance and efficiency of the engine. The second circuit 58 bleeds pressurized secondary air 34b at a second pressure and second temperature which are correspondingly lower than the first pressure and first temperature of the primary air 34a.

For example, the second preultimate compressor stage may be the third stage including the third row of compressor blades 3, and the pressurized secondary air 34b may be extracted at the following guide vanes with a corresponding third-stage pressure P3 and third-stage temperature T3 which are substantially lower than the corresponding fifth-stage pressure P5 and fifth-stage temperature T5 of the extracted primary air 34a.

In this way, non-CDP air may be used for suitably cooling the first stage HP blades 44 for enhanced engine efficiency. The pre-CDP air is less expensive than the CDP air since it has not undergone the full compression cycle, and correspondingly, the temperature of the pre-CDP air is substantially less than the temperature of the CDP air by up to hundreds of degrees.

As initially shown in FIG. 2, the first bleed circuit 56 may be suitably configured to extend radially inwardly from the fifth stage bleed inboard of the annular combustor 20 to reach the HP blades 44 along their supporting rotor disk 46.

Correspondingly, the second bleed circuit 58 may be suitably configured to extend radially outwardly from the third stage bleed outboard of the annular combustor 20 to the same first stage blades 44.

More specifically, the LPT 24 is illustrated in more detail in FIGS. 3 and 4 in serial flow communication with the HPT 22. The LPT has several stages as desired including a first stage LP nozzle 60 which directly follows the row of HP blades 44.

The nozzle 60 includes a row of hollow LP vanes 62 mounted between radially inner and outer annular bands 64,66. And, a row of first stage LP rotor blades 68 follows the stator vanes 62, and extend radially outwardly from a supporting rotor disk in a conventional manner.

Since the LP nozzle vanes 62 are directly coupled to the first stage HP blades 44, they provide an efficient structure through which the secondary bleed air 34b may be channeled.

Accordingly, the second bleed circuit 58 may be conveniently routed radially inwardly through one or more of the vanes in the LP nozzle 60 to reach the HP blades 44, while also providing effective cooling of the stator vanes 62 themselves.

As best illustrated in FIG. 4, the HP blades 44 may have any conventional configuration, but are modified for receiving the two sources of pre-CDP air for cooling thereof. The airfoil portion of each blade extends radially in the combustion flowpath which is bound by a radially inner platform of the blade supported from a shank and axial-entry dovetail. Each blade dovetail is suitably mounted in a corresponding axial dovetail slot 70 found in the perimeter rim of the supporting rotor disk 46.

The full row of blades 44 is axially trapped by opposite forward and aft annular blade retainers 72,74. The first bleed circuit 56 may therefore join the row of blades 44 at the forward blade retainer 72 to feed the primary bleed air 34a, while the second bleed circuit 58 may conveniently join the row of blades 44 at the aft blade retainer 74 to feed the secondary bleed air 34b under different pressures and temperatures.

The individual blades 44 illustrated in FIG. 4 are typically formed by casting and include internal cooling channels extending the full radial span thereof from the base of the dovetail to the radially outer tip. The forward cooling channel 48, and the middle channel as well, have corresponding inlets at the base of the dovetail disposed in direct flow communication with the dovetail slot 70.

Correspondingly, the aft cooling channel 52 also extends to the base of the dovetail, but the cast inlet therein is suitably sealed shut by a thin plate suitably brazed thereto to prevent flow communication with the dovetail slot. Instead, an inlet hole 76 may be cast or drilled in the aft face of the blade shank in flow communication with the aft cooling channel 52 therein.

In this way, the aft cooling channels 52 of the blades have suitable inlets through the shanks thereof at the aft blade retainer 74 which inlets may be conveniently disposed in flow communication with the second bleed circuit 58 extending through the LP nozzle 60 and inner band 64.

The LP nozzle preferably includes an aft annular manifold 78 mounted inboard of the inner band 64, with an aft flow inducer 80 disposed at the forward end thereof in flow communication with the blade aft channels 52 through the corresponding shank inlets and corresponding apertures through the aft blade retainer. The flow inducer 80 may have any conventional configuration and typically includes a row of vanes for tangentially accelerating the secondary air 34b from the stationary aft manifold 78 onto the rotating aft blade retainer and disk. This provides an efficient mechanism for channeling the pressurized secondary air 34b to the rotating blades without substantial loss in pressure thereof.

FIGS. 2-4 illustrate that the first bleed circuit 56 may be conveniently disposed inside the first drive shaft 30 which extends axially between the compressor 18 and the HP disk 46. As indicated above, the individual turbine blades 44 have conventional dovetails which are mounted in the corresponding dovetail slots 70 extending axially across the perimeter of the turbine disk 46. The bleed circuit 56 is preferably configured to channel the primary bleed air 34a radially outwardly over the forward face of the disk and into the dovetail slots 70 for enhanced cooling of the turbine disk itself.

The combustor 20 illustrated in FIGS. 2 and 3 is supported in a conventional manner radially around an annular inner combustor case 82 which provides circumferentially therearound an inner boundary for the CDP air from the compressor that is used for cooling the radially inner and outer liners of the combustor itself. The first bleed circuit 56 is therefore preferably independent from the CDP air channel surrounding the combustor inner case 82.

The forward blade retainer 72 illustrated in FIG. 3 is an annular plate extending radially along the disk forward face and is spaced axially forward therefrom to define a forward distribution passage or manifold 84 which is disposed in flow communication with the dovetail slots 70 around the disk perimeter. The first bleed circuit 56 continues aft in flow communication with the inner end of the manifold 84.

In this way, the primary bleed air 34a is channeled radially outwardly through the forward manifold 84 under centrifugal force as the disk 46 rotates during operation to deliver the bleed air into the full row of dovetail slots 70. The retainer plate 72 may include impeller vanes (not shown) inside the manifold 84 for further increasing air pressure if desired.

The turbine disk 46 illustrated in FIG. 3 has the typical wide perimeter rim in which the axial dovetail slots 70 are formed, with a thinner annular web extending radially inwardly therefrom and terminating in a wider central disk hub having a center bore therethrough. The first drive shaft 30 is fixedly joined at an aft flange to the disk web by a row of bolts.

A secondary hub 86 is integrally joined at the base end of the forward blade retainer 72 and is fixedly mounted in the bolted flanges using the same bolts. Suitable apertures are provided through the junction of the retainer plate 72 and secondary hub 86 to provide flow communication between the forward portion of the first bleed circuit 56 and the manifold 84.

The first bleed circuit 56 is bounded outboard by the drive shaft 30 and is preferably bounded inboard by a tubular baffle 88 which extends axially forwardly from the bore of the secondary hub 86 upstream to the intermediate stage of the compressor.

For example, each of the seven stages of the HP compressor 18 shown in FIG. 2 includes a corresponding compressor rotor disk 90 supporting a corresponding row of the compressor blades 1-7, with corresponding dovetails and dovetail slots in the perimeters of the disks in a conventional configuration. The tubular baffle 88 preferably extends forward to the center bore of the hub of the fifth stage compressor disk in sealing contact therewith.

The first bleed circuit 56 preferably also includes a plurality of circumferentially spaced apart inlet tubes 92 which extend radially inwardly from the base of the fifth stage compressor blades 5 along the corresponding compressor disk 90 to channel the primary bleed air 34a radially inwardly and axially around the baffle 88 for flow to the outlet manifold 84. The inlet tubes 92 may have a conventional configuration for bleeding interstage pressurized air through corresponding apertures in the compressor rotor between adjacent rows of the compressor blades, preferably in the region of the corresponding row of guide vanes therebetween.

The internal cooling channels of the blades 44 are suitably joined by the two bleed circuits 56,58 in flow communication with the HP compressor 18 for receiving pressurized air therefrom for internally cooling each blade. However, the pressure of the internal cooling air must be sufficiently greater than the pressure of the external combustion gases for maintaining suitable backflow margins at both the leading and trailing edges of the blades, and therebetween, to prevent ingestion or backflow of the combustion gases into the turbine blades during operation.

Since the pressure of the combustion gases 38 drops substantially between the leading and trailing edges of the turbine blades 44, the two bleed circuits 56,58 may be selected to complement this pressure drop. In particular, the first preultimate stage of the compressor is preferably the fifth stage which is disposed suitably upstream from the last stage of the compressor to provide a suitable backflow margin in the primary air 34a at the leading edge holes 50. And, the second preultimate stage in the preferred embodiment is the third compressor stage which is disposed upstream from the fifth stage to provide a corresponding backflow margin in the secondary bleed air 34b at the trailing edge holes 54.

In the exemplary embodiment illustrated in FIG. 4, the forward blade channels 48 are disposed in flow communication with the forward manifold 84 for receiving the primary bleed air 34a from the first bleed circuit 56. In this way, the first stage turbine blades 44 may be supplied with the fifth stage bleed air at the corresponding fifth stage pressure P5 and temperature T5 for enhanced cooling of the turbine blades themselves, with sufficient backflow margin therein.

In FIG. 2, the fifth compressor stage is selected to provide cooling air to the HPT rotor since the fifth stage can effect a static pressure in the primary bleed air 34a which is greater than the total relative pressure (PTR) in the combustion gases 38 at the leading edges of the first stage turbine blades 44 in the vicinity of the corresponding row of first cooling holes 50 thereat.

Since the turbine blades 44 rotate during operation, and first receive the incident combustion gases 38 along the leading edges thereof, the internal pressure of the cooling air being discharged through the leading edge holes 50 must be suitably greater than the total relative pressure of the external combustion gases to provide a suitable backflow margin to prevent ingestion of the combustion gases into the turbine blades.

However, due to the pressure drop in the combustion gases over the turbine blades 44 during operation, the fifth stage primary bleed air 34a has more than sufficient pressure for the lower pressure combustion gases at the blade trailing edges. Instead, the second bleed circuit 58 is used to provide the lower pressure, secondary bleed air 34b to the aft cooling channels 52 of the turbine blades. The exemplary third stage bleed air 34b has a static pressure which is suitably greater than the static pressure in the combustion gases 38 at the trailing edge holes 54 of the blades to provide an adequate backflow margin.

Since the backflow margin requirements at the leading and trailing edges of the turbine blades 44 are based on different pressures, then different sources of bleed air may be selected from the different stages of the compressor for best matching those differences. The choice of the intermediate stage of the compressor is dependent on the compression cycle in the HP compressor 18 and the corresponding expansion cycle in the HPT 22.

Since the HPT 22 is a single-stage turbine, a substantial pressure drop in the combustion gases 38 occurs across the nozzle and blades thereof. Interstage bleed air at a lower pressure than the CDP air may be extracted from the compressor and suitably driven under differential pressure to the HPT while still maintaining a suitable backflow margin with a greater pressure than that of the combustion gases at both leading and trailing edges of the turbine blades 44.

As indicated above, the pressure and temperature of the air 34 increases in steps in each of the seven stages of the HP compressor 18, as represented by the corresponding row of the compressor blades 1-7. The collective or total increase in pressure of the air in the compressor may be quite great and may reach 10-30 atmospheres, for example. Correspondingly, the rise in temperature of the pressurized air 34 across the compressor 18 may be many hundreds of degrees.

This great range in pressure and temperature within the many stages of the compressor 18 permits various options for the two bleed circuits 56,58. In one embodiment, the first preultimate stage of the compressor which feeds the first bleed circuit 56 is the fifth stage which is at least two stages upstream from the last or seventh stage of the compressor.

Correspondingly, the second preultimate stage which feeds the second bleed circuit 58 is the third stage of the compressor which is at least two stages upstream from the fifth stage used for the first bleed circuit.

The third and fifth compressor stages have air at correspondingly different pressures and temperatures, with the pressures thereof being selected to best match the external pressure experienced by the first stage turbine blades 44 to provide sufficient backflow margin without wasting expensive or pressurized air during operation. Correspondingly, the lower temperature of the interstage bleed air used for cooling the turbine blades is more effective for blade cooling due to that lower temperature.

By utilizing non-CDP air in the two bleed circuits 56,58 disclosed above, a significant reduction in diversion of the CDP air may be obtained with a correspondingly large increase in engine efficiency. Since CDP air is the most expensive air in the engine attributable to the maximum work performed thereon for achieving the high pressure thereof, any diversion thereof from the combustion process itself correspondingly reduces engine efficiency. And, by limiting that diversion of CDP air the overall efficiency of the engine may be increased.

In the exemplary embodiment illustrated in FIG. 3, CDP air is not used for cooling the first stage turbine blades or rotor disk, and therefore the conventional flow inducer may be eliminated in this design, which eliminates the corresponding complexity thereof. Instead, a simple annular seal frame 94 extends radially inwardly from the inner case 82 and includes an annular sealing pad in the central bore thereof to sealingly join labyrinth seal teeth extending radially outwardly from the secondary hub 86 above the row of mounting bolts.

The modification of the high pressure turbine 22 disclosed above to provide the independent first and second bleed circuits 56,58 for cooling thereof may have various configurations for enjoying the benefits thereof. Bleeding interstage compressor air is well known and is used for various purposes in the prior art. However, CDP air is commonly used for cooling first stage turbine blades in view of their substantial cooling and backflow margin requirements.

Now recognizing the substantial drop in pressure across the turbine blades, the primary air 34a may be bled from the first preultimate stage of the compressor 18 to feed the forward cooling channels 48 of the turbine blade 44 for discharge through the leading edge cooling holes 50 with suitable backflow margin.

Correspondingly, the secondary bleed air 34b may be bled from the different, second preultimate third stage of the compressor 18 to feed the aft cooling channels 52 of the turbine blades 44 for discharge through the trailing edge cooling holes 54 at suitable backflow margin.

The primary bleed air 34a may be conveniently channeled inboard of the annular combustor 20 to the turbine blades 44 with a static pressure suitably greater than the total relative pressure in the combustion gases at the blade leading edge holes 50 for the desired backflow margin. And, the secondary bleed air 34b may be conveniently channeled outboard of the combustor 20 to the turbine blades 44 through the downstream nozzle vanes 62 at a different static pressure which is greater than the static pressure in the combustion gases at the blade trailing edge holes 54 to provide the desired backflow margin.

The static pressure of the secondary bleed air 34b is suitably less than the static pressure of the primary bleed air 34a and may be used to better match the different pressures in the combustion gases external to the first stage turbine blades 44.

The use of non-CDP air for cooling the first stage turbine disk and blades is significant for the enhanced cooling thereof and for its compounding effect in improving the configuration and overall efficiency of the engine. Since the expensive CDP air is not used for turbine rotor cooling the overall efficiency of the engine increases.

Cooler air is used for cooling the turbine rotor and blades which therefore requires less cooling air and also allows for longer blade life. A cooler operating turbine rotor may then be formed from less expensive superalloys in view of the lower operating temperature thereof.

The inducer system for the CDP air is eliminated as described above, which simplifies engine design and allows lower weight thereof.

And, the elimination of CDP air for cooling the turbine rotor permits redesign of the HPT itself in conjunction with the compressor 18 and combustor 20 for further increasing the collective efficiency thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

The invention claimed is:

1. A gas turbine engine comprising:
   a fan, compressor, combustor, high pressure (HP) turbine and low pressure (LP) turbine in serial flow communication;
   said compressor including rows of compressor blades for pressurizing air sequentially in corresponding stages;
   said HP turbine including a single stage row of hollow rotor blades mounted in corresponding dovetail slots in the perimeter of a supporting rotor disk;
   said LP turbine including a row of hollow first stage LP vanes following said HP blades;
   a first interstage bleed circuit joined in flow communication from a bleed inlet extending radially inwardly between adjacent rows of said compressor blades in a first preultimate stage of said compressor to said HP blades inboard of said combustor; and
   a second interstage bleed circuit joined in flow communication between a second preultimate stage of said compressor and said HP blades outboard of said combustor and through said LP vanes.

2. An engine according to claim 1 wherein:
   said HP blades are trapped in corresponding dovetail slots in the perimeter of said disk by forward and aft blade retainers;
   said first bleed circuit joins said row of blades at said forward blade retainer; and said second bleed circuit joins said row of blades at said aft blade retainer.

3. An engine according to claim 2 wherein:
said HP blades are joined to said compressor blades by a drive shaft extending inboard of said combustor;
said forward blade retainer extends inwardly along the forward face of said HP disk to define an annular manifold disposed in flow communication with said dovetail slots around said disk perimeter; and
said first bleed circuit is joined in flow communication with said manifold.

4. An engine according to claim 3 wherein each of said HP blades comprises:
a forward channel feeding leading edge cooling holes from said dovetail slots; and
an aft cooling channel feeding trailing edge cooling holes from a shank thereof at said aft blade retainer.

5. An engine according to claim 4 further comprising an annular aft manifold mounted inboard of said LP vanes, with an aft flow inducer disposed at a forward end thereof in flow communication with said blade aft channels.

6. An engine according to claim 5 wherein:
said HP turbine further includes a first stage turbine nozzle having a row of stator vanes disposed between said combustor and HP blades for dropping pressure in combustion gases across the leading and trailing edges of said HP vanes;
said HP blades are configured for additionally dropping pressure in said combustion gases across the leading and trailing edges thereof;
said first preultimate stage is disposed upstream from the last stage of said compressor to bleed primary air from said compressor at a first pressure; and
said second preultimate stage is disposed upstream from said first preultimate stage to bleed secondary air from said compressor at a lower second pressure.

7. An engine according to claim 6 wherein said first bleed circuit is configured to effect a static pressure in said primary air greater than the total relative pressure in said combustion gases at said blade leading edge holes.

8. An engine according to claim 6 wherein said second bleed circuit is configured to effect a static pressure in said secondary air greater than the static pressure in said combustion gases at said blade trailing edge holes.

9. An engine according to claim 6 wherein said first preultimate stage is at least two stages upstream from said last compressor stage, and said second preultimate stage is at least two stages upstream from said first preultimate stage.

10. A method of using said engine according to claim 6 comprising:
channeling said primary air through said first interstage bleed circuit from said first preultimate stage of said compressor to said forward channel in said HP blades to effect a backflow margin at said blade leading edge holes; and
channeling said secondary air through said second interstage bleed circuit from said second preultimate stage of said compressor to said aft channel in said HP blades to effect a backflow margin at said trailing edge holes.

11. A gas turbine engine comprising:
a multistage compressor disposed in serial flow communication with a combustor and high pressure (HP) turbine;
said turbine including a row of first stage turbine rotor blades extending radially outwardly from a supporting rotor disk;
each of said blades including a forward cooling channel feeding leading edge cooling holes, and an aft cooling channel feeding trailing edge cooling holes;
a first interstage bleed circuit joined in flow communication from a bleed inlet extending radially inwardly between adjacent rows of compressor blades in a first preultimate stage of said compressor to said blade forward channels to provide thereto pressurized primary air at a first pressure; and
a second interstage bleed circuit joined in flow communication between a second preultimate stage of said compressor and said blade aft channels to provide thereto pressurized secondary air at a second pressure lower than said first pressure.

12. An engine according to claim 11 wherein:
said compressor includes rows of said compressor blades for pressurizing air sequentially in corresponding stages;
said first bleed circuit extends radially inwardly from said first preultimate stage inboard of said combustor to said blades; and
said second bleed circuit extends radially outwardly from said second preultimate stage outboard of said combustor to said blades.

13. An engine according to claim 12 further comprising:
a low pressure (LP) turbine following said HP turbine in serial flow communication, and including a first stage LP nozzle directly following said HP blades; and
said second bleed circuit is routed radially inwardly through said LP nozzle to reach said HP blades.

14. An engine according to claim 13 wherein:
said HP blades are trapped in corresponding dovetail slots in the perimeter of said disk by forward and aft blade retainers;
said first bleed circuit joins said row of blades at said forward blade retainer; and
said second bleed circuit joins said row of blades at said aft blade retainer.

15. An engine according to claim 14 wherein:
said HP turbine further includes a first stage turbine nozzle having a row of stator vanes disposed between said combustor and HP blades for dropping pressure in combustion gases across the leading and trailing edges of said HP vanes;
said HP blades are configured for additionally dropping pressure in said combustion gases across the leading and trailing edges thereof;
said first preultimate stage is disposed upstream from the last stage of said compressor to provide a backflow margin in said primary air at said leading edge holes; and
said second preultimate stage is disposed upstream from said first preultimate stage to provide a backflow margin in said secondary air at said trailing edge holes.

16. An engine according to claim 15 wherein said first bleed circuit is configured to effect a static pressure in said primary air greater than the total relative pressure in said combustion gases at said blade leading edge holes.

17. An engine according to claim 15 wherein said second bleed circuit is configured to effect a static pressure in said secondary air greater than the static pressure in said combustion gases at said blade trailing edge holes.

18. An engine according to claim 15 wherein said first preultimate stage is at least two stages upstream from said last compressor stage, and said second preultimate stage is at least two stages upstream from said first preultimate stage.

19. An engine according to claim 15 wherein:
said HP blades are joined to said compressor blades by a drive shaft extending inboard of said combustor;
said forward blade retainer extends inwardly along the forward face of said HP disk to define an annular manifold disposed in flow communication with said dovetail slots around said disk perimeter; and
said first bleed circuit is joined in flow communication with said manifold.

20. An engine according to claim 19 wherein said blade forward cooling channels extend to said dovetail slots for receiving said primary air therefrom.

21. An engine according to claim 15 wherein:
said LP nozzle includes a row of hollow LP vanes mounted between inner and outer bands; and
said second bleed circuit extends radially through said LP vanes to channel said secondary air inboard of said inner band.

22. An engine according to claim 21 wherein said blade aft cooling channels extend aft through the shanks of said HP blades to said aft blade retainer in flow communication with said inner band of said LP nozzle for receiving said secondary air therefrom.

23. An engine according to claim 22 further comprising an annular aft manifold mounted inboard of said inner band of said LP nozzle, with an aft flow inducer disposed at a forward end thereof in flow communication with said blade aft channels.

24. A method of cooling first stage blades following in turn a combustor and compressor in a gas turbine engine, comprising:
bleeding primary air from a bleed inlet extending radially inwardly between adjacent rows of compressor blades in a first preultimate stage of said compressor to a forward cooling channel in said blades for discharge from leading edge cooling holes therein; and
bleeding secondary air between a different second preultimate stage of said compressor and an aft cooling channel in said blades for discharge from trailing edge cooling holes therein.

25. A method according to claim 24 further comprising:
channeling said primary air inboard of said combustor to said blades with a static pressure greater than the total relative pressure in combustion gases at said blade leading edge holes to provide a backflow margin thereat; and
channeling said secondary air outboard of said combustor to said blades with a different static pressure greater than the static pressure in said combustion gases at said blade trailing edge holes to provide a backflow margin thereat.

* * * * *